July 13, 1948. H. BERMAN 2,445,132
APPARATUS FOR DETERMINING ELECTRICAL
AXIS OF QUARTZ CRYSTALS
Filed Nov. 20, 1943 3 Sheets-Sheet 2

INVENTOR.
Harry Berman
BY
ATTORNEYS

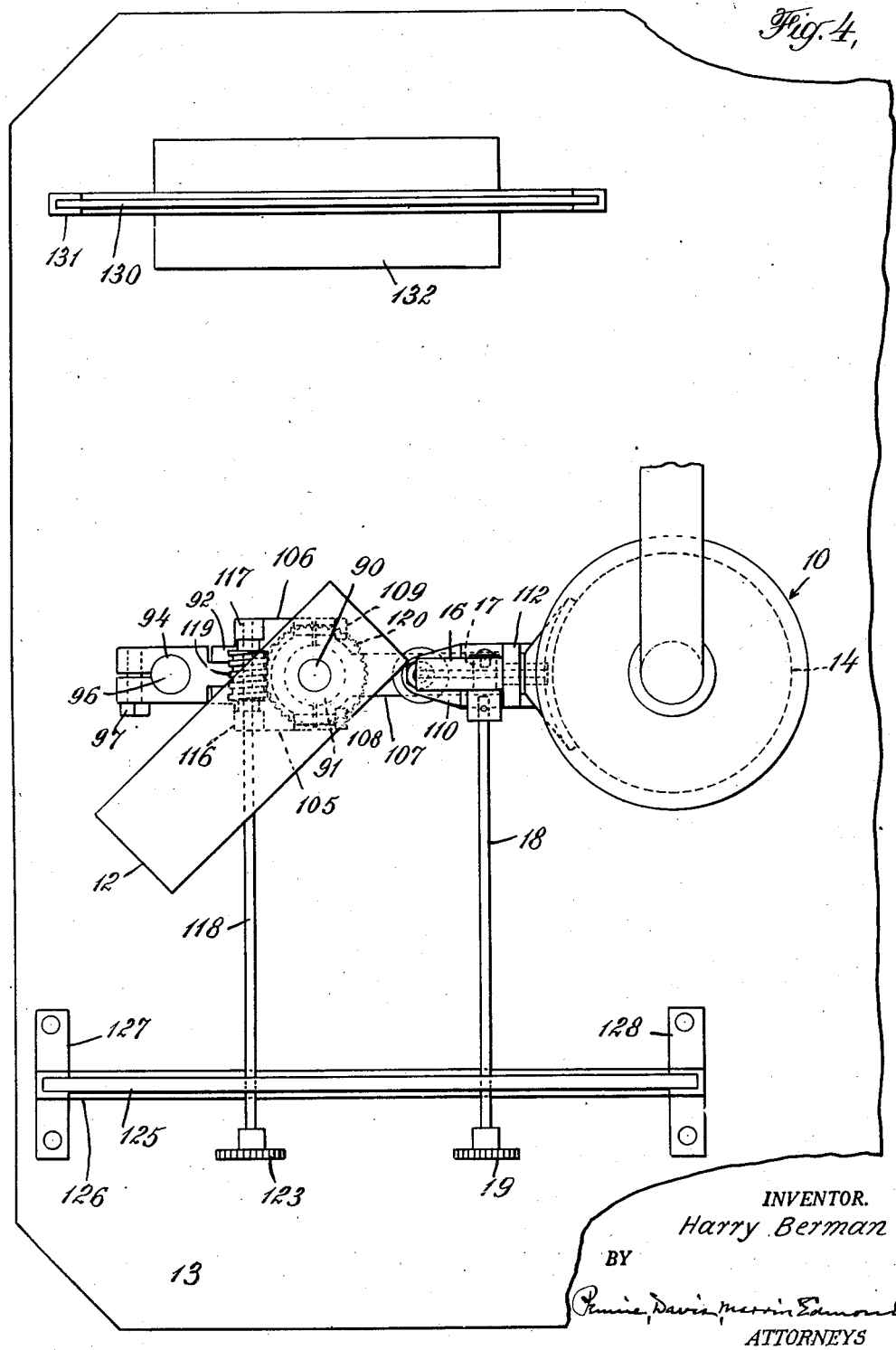

Patented July 13, 1948

2,445,132

UNITED STATES PATENT OFFICE 2,445,132

APPARATUS FOR DETERMINING ELECTRICAL AXIS OF QUARTZ CRYSTALS

Harry Berman, Cambridge, Mass., assignor to Reeves-Ely Laboratories, Inc., New York, N. Y., a corporation of New York Application November 20, 1943, Serial No. 511,202

6 Claims. (Cl. 250—52)

This invention relates to quartz oscillator plates and has for its object certain improvements in apparatus for determining an electrical axis of quartz crystals employed in manufacturing the oscillator plates.

Various methods and forms of apparatus have been proposed for determining an electrical axis among the three electrical axes of quartz crystals, including those in which X-rays are utilized. The crystals are made up of atoms arranged in a definite, systematic, periodic manner. A rough piece of quartz with all faces broken off is still a crystal because the atoms retain their systematic, periodic, arrangement and the quartz hence has vectorial properties. In other words, the absence of faces from a crystal in no way changes its properties. When X-rays strike a crystal, a phenomenon takes place which is similar to the diffraction of ordinary light rays by an optical grating. The nature of the diffraction is dependent upon the diffracting power and arrangement of the constituent atoms. Around each atomic diffraction center, secondary X-ray waves are built up which interfere with each other. Only in certain directions are the waves in phase and reinforce one another, giving rise to a "reflected" beam of X-rays. A trued Z-section of crystal is placed flat on an X-ray table which is rotated until maximum reflection is obtained. The reflected beam is passed into an ionization chamber, which is an instrument for the detection of X-rays. The ionization chamber consists essentially of a glass vessel filled with absorbing gas, such as argon, methyl bromide, or xenon, and containing two electrodes. A difference of potential is maintained between the electrodes so as to collect the ions formed by the X-ray beam as it is absorbed in the gas. The output of the chamber is then amplified by a direct current amplifier, and the resulting current is read on a micro-ammeter.

Determining an electrical axis of quartz crystals in this manner has some serious disadvantages. The optical axis of the crystal must, for example, first be determined and the crystal must then be cut to provide a Z-section with a trued reference surface which must be placed flat on the X-ray table with the crystal prism directions in contact with fixed stops. These operations are somewhat complicated and render difficult the subsequent necessary operations to obtain oscillator plates of predetermined cut.

As a result of my investigations, I have discovered that these disadvantages may for the most part be overcome. An electrical axis of quartz crystals may be readily determined without preliminarily obtaining trued Z-sections. The crystal may be retained in the shape it was in when its optical axis was determined. The operations are considerably simplified and result in an accurate determination of the electrical axis while leaving the crystal in an excellent position for cutting.

In accordance with the method of the invention, a stream of X-rays is passed against a quartz crystal in a predetermined direction with respect to a given reference line removed from the crystal, the optical axis of the crystal being in predetermined relationship with the reference line. The crystal is moved in the stream of X-rays, while maintaining the optical axis in fixed relationship with the reference line, to bring an electrical axis of the crystal in predetermined relationship with the reference line. The particular electrical axis of the crystal is then fixed in that predetermined relationship so that both the optical axis and the electrical axis of the crystal are maintained in fixed relationship to the reference line.

The invention will be better understood by referring to the accompanying drawings, taken in conjunction with the following description, in which:

Fig. 4 is another plan view of the same apparatus, showing some additional details, including a protective shield against X-rays.

Figure 1:
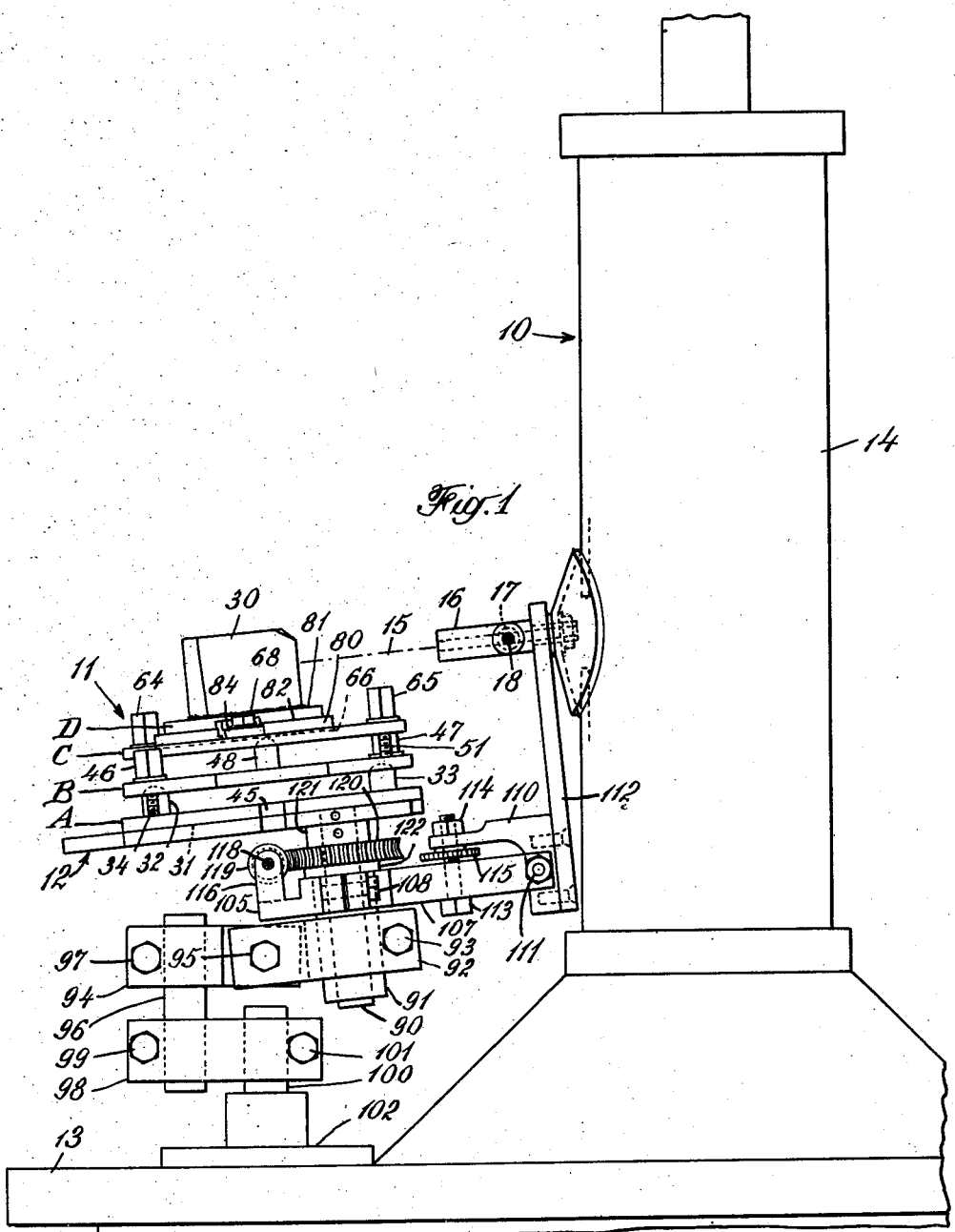
Fig. 1 is a side elevation, partly in section, of an apparatus adapted for and illustrative of a practice of the invention.

The apparatus shown comprises an X-ray machine 10, a quartz crystal holder 11, and an adjustable guide support 12, all of which are suitably mounted on a base 13. The X-ray machine is of conventional construction consisting of a housing 14 containing means, not shown, for producing and emitting a stream of X-rays 15 through an X-ray outlet 16 integrally secured to the housing at a suitable level above and between the guide support and housing. The outlet is provided with a valve 17 operatively secured to a stem 18 terminating in a turn knob 19. A turn of the knob is adapted to permit a stream of the X-rays to be emitted from the outlet in the general direction of the guide support.

The particular quartz crystal holder shown is more fully described and claimed in the pending application of William C. Speed, Serial No.

511,198, filed November 20, 1943, now Patent No. 2,431,282. It comprises a series of superposed supports or bases: a fixed base A, a lower tiltable base B, an upper tiltable base C and a rotatable base D. Bases D and C are pivotally tiltable at right angles to each other as well as toward and away from base A. Base D is rotatable laterally on base C. A quartz crystal 30 is shown mounted on base D.

Base A is provided with an inverted guide channel 31 open at both ends, rectangular in crosssection, and adapted to fit over guide support 12, also rectangular in cross-section. The part of the holder that defines the channel is advantageously used as a reference part to which the optical axis and the electrical axis of the crystal may be suitably adjusted. A pair of spaced pivot posts 32 and 33 is integrally secured to and centrally of the base at opposite ends; the upper ends of the posts being rounded, as shown, so that base B may be supported and readily tilted thereon. A pair of spaced bolts 34 and 35 is integrally secured to base A at diagonal corners, the bolts being sufficiently long to extend through and a convenient distance above base B.

Base B is provided on its underside with a spaced pair of concave recesses which are adapted to receive and to accommodate the rounded upper ends of pivot posts 32 and 33 respectively extending above base A. The opposite sides of base B have cut-away portions to provide free working space above bolt slots 44 and 45 respectively in base A. Base B is also provided with a pair of slotted bolt holes, not shown, at diagonal corners to accommodate bolts 34 and 35, with nuts 46 and 47, respectively in base A. A pair of spaced pivot posts 48 and 49 is integrally secured to and centrally of the base at opposite sides, the upper ends of the posts being rounded, as shown, so that base C may be supported and tilted thereon. These pivot posts are aligned at right angles to pivot posts 32 and 33 of base A. A pair of spaced bolts 50 and 51 is integrally secured to base B at diagonal corners, the bolts being sufficiently long to extend through and a convenient distance above base C.

Base C is provided on its underside with a pair of spaced concave recesses which are adapted to receive and accommodate the rounded upper ends of pivot posts 48 and 49 extending above base B. The diagonal corners are cut away, as shown, to permit ready access to bolts 34 and 35 extending above base B. Base C is also provided with a pair of slotted bolt holes, not shown, at the other diagonal corners to accommodate bolts 50 and 51 with nuts 64 and 65, respectively, in base B. The upper side of base C is provided with a circular recess 66 adapted to receive and accommodate the lower portion of base D. A spaced pair of threaded bolt holes, not shown, extend through base C at opposite sides, and accommodate bolts 67 and 68.

Base D consists of a circular bottom disk 80, preferably of metal, integrally secured to a smaller circular top disk 81, preferably made of fiberboard or the like. An outer annular clamping shoulder 82 is provided by the bottom disk due to the smaller diameter of the top disk. A pair of clamps 83 and 84 is attachable to base C by bolts 67 and 68, respectively in base C. Each clamp has a zig-zag configuration, the outer end being provided with a narrow depending shoulder portion adapted to rest on the top of base C and to pivot thereon. The other end of the clamp consists of a laterally extending portion adapted to be pressed downwardly on the top of base D when bolts 67 and 68 are tightened.

The guide support 12 is in turn adjustably supported on base 13 by means of a post 90, to which it is integrally secured, a hollow shaft 91 mounted around the post, a clamp 92 fitting around the lower end of the hollow shaft and securable thereto by means of a bolt 93; a second clamp 94 securable to the first clamp by means of a bolt 95 and to the upper end of a second post 96 by means of a bolt 97; a third clamp 98 securable to the lower end of the second post by means of a bolt 99 and to a third post 100 by means of a bolt 101; the third post being secured to a base 102 in turn supported by base 13.

A lateral yoke consisting of a pair of bifurcated members 105 and 106 and a single bifurcated member 107 fitting around and securable to hollow shaft 91 by a pair of bolts 108 and 109. The other end of yoke member 107 is slotted to fit around a lateral arm 110, the two being securable to one another by a bolt 111. The lateral arm is integrally secured to the lower end of a depending yoke 112, the upper end of which fits over X-ray outlet 16 so as to rock thereon. The lateral arm 110 extends over lateral yoke member 107 a suitable distance. A bolt 113 with nut 114 extends through the arm and yoke member. A knurled adjustment lock nut 115 is located on the bolt between the arm and the yoke member. The other lateral yoke members 105 and 106 are provided with a pair of spaced lugs 116 and 117 fitted with a shaft 118 supporting a worm 119 in mesh with a worm gear 120 integrally secured to post 90 by means of a set screw in boss 121 of the worm gear. The lower face of the worm gear rests on a supporting collar 122 integrally secured to hollow shaft 91. The free end of shaft 118 terminates in a knurled turn knob 123 with which to operate the worm and worm gear.

Fig. 4 also shows means for shielding an operator of the apparatus from stray X-rays. It comprises a sheet of leaded glass 125, or another suitable X-ray filtering material, supported in a frame 126 secured to a pair of base members 127 and 128 integrally fastened to main base 13. Shaft 118 from worm 119 and stem 18 from valve 17 in X-ray outlet 16 extend through the sheet of leaded glass a suitable distance so that the operator may turn knobs 19 and 123 without coming in contact with stray X-rays.

Figure 2:
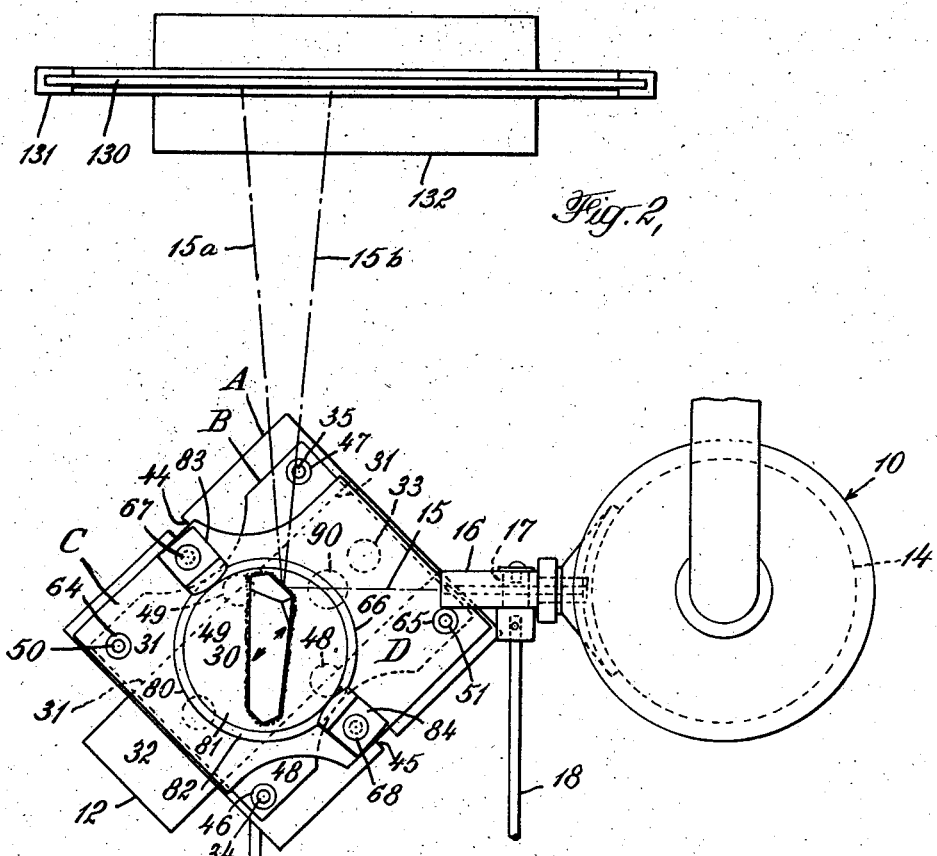
Fig. 2 is a plan view of the same apparatus, but includes a plan view of a fluorescent screen.
Figure 3:
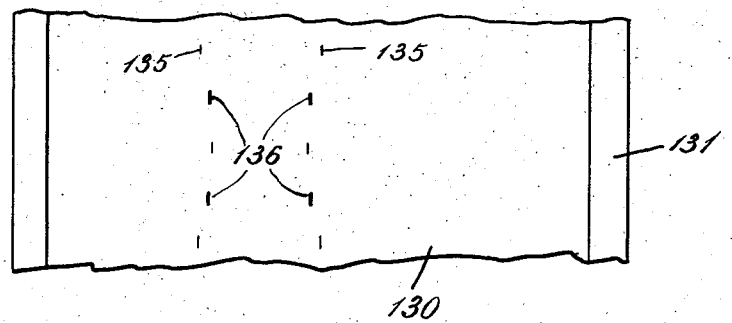
Fig. 3 is a fragmentary view in front elevation of the fluorescent screen.

Referring more especially to Figs. 2 and 3, the apparatus shown also includes a fluorescent screen 130 mounted in a frame 131 supported on a base 132 movably resting on main base 13. The screen is located at a suitable distance from and at a suitable angle to crystal 30 so that X-rays 15 deflected from the crystal may impinge on the screen. All of the apparatus is located in a dark room so that X-rays deflected from the crystal may cause luminous spots to appear on the fluorescent screen.

The above described apparatus may be operated as follows in a practice of the invention:

A quartz crystal, or section of crystal, 30 is suitably mounted on the top of upper disk 81 of base D, for example by building up a narrow body of warmed viscous tar, not shown, around the base of the crystal and on top of the fiber disk. The lower disk 80 of base D is inserted in circular recess 66 of base C. The optical axis of the crystal is first suitably determined and placed in predetermined relationship with the reference line or given part of holder 11, preferably base A. This may be done, for example, in accordance with the method disclosed in my copending application of Serial No. 511,199, filed November 20, 1943. Base D is suitably rotated or swiveled in circular recess 66, and base C is tilted forward or backward on pivot posts 48 and 49 until the optical axis is placed in predetermined relationship with the reference line or given part of base A. Bolts 67 and 68 are screwed downward to tighten clamps 83 and 84 on annular clamping shoulder 82. This fixes the crystal in its adjusted position so far as base D is concerned. Nuts 64 and 65 on bolts 50 and 51 are tightened on base C so that the base remains fixed in its adjusted position. Due to the construction of holder 11, the optical axis of the crystal may be placed parallel to the sides and top of guide channel 31 of fixed base A. In other words, the adjustments of bases C and D place the optical axis of the crystal in predetermined and fixed relationship with a given reference line or part of the holder.

An electrical axis of the crystal is then determined. To this end holder 11, with bases C and D fixed in their adjusted positions, is mounted on guide support 12 by fitting the inverted guide channel 31 in base A of the holder over guide support 12 so that crystal 30 falls in the path of beam of X-rays 15. To cause the crystal to fall in the path of X-rays, it may be necessary to make suitable adjustments of the supporting structure accompanying guide support 12. For example, the whole series of nuts 93, 95, 97, 99, 101, 111, 114, and 122 may be loosened and their cooperating clamps 92, 94, and 98, lateral yoke member 107, depending yoke 112, and lateral arm 110 adjusted to place crystal 30 in suitable position. It will be obvious that the various parts cooperatively associated with guide support 12 may be adjusted in trial and error moves until crystal 30 is properly located in the beam of X-rays emitted through outlet 16. The parts are adjusted until the direction of travel of the beam of X-rays is substantially parallel to the reference line or part of the holder, and also of the guide support. When this occurs, all of the nuts are tightened so that the guide support 12 is fixed against any movement except lateral movement in its own plane when it is swiveled about post 90.

Knob 19 is turned to open valve 17 in outlet 16 so that a beam of X-rays 15 is emitted from housing 14 of X-ray machine 10. This beam of X-rays strikes crystal 30 and may be deflected as a plurality of beams 15a, 15b, etc. Knob 123 is turned in order to swivel guide support 12 about post 90, and hence to move crystal 30 laterally so that the X-rays may be suitably deflected against fluorescent screen 130. The screen is moved on main base 13 until it is located to permit impingement of the deflected X-rays.

As noted above, when the crystal and holder are mounted on guide support 12, bases D and C are fixed in their adjusted positions to place the optical axis of the crystal in predetermined relationship with the reference line or part of the holder, preferably parallel to the sides of the inverted guide channel 31 in the bottom of fixed base A. To determine an electrical axis of the crystal, base B is tilted to the left or right on pivot posts 32 and 33 about an axis parallel to the optical axis until the particular electrical axis of the crystal is placed in predetermined relationship with the reference line or part of the holder, preferably at right angles or perpendicular to the reference line or part of the holder. In the practice just described the particular electrical axis is adjusted until it is perpendicular to the plane defined by the top of inverted channel 31 in base A.

Due to the construction of holder 11, the optical axis of the crystal remains in its predetermined and fixed relationship even though, in determining an electrical axis of the crystal base B is tilted to the left or right. While the crystal itself, including bases C and D, may be moved simultaneously to the left or right with base B, the optical axis of the crystal nevertheless remains parallel to guide channel 31 in base A. When, therefore, an electrical axis of the crystal is brought into predetermined relationship with the reference line or part of the guide channel in base A, the optical axis and the particular electrical axis as well as the other two electrical areas, are necessarily also brought into predetermined relationship with the reference line or part of the holder.

To locate particular electrical axis of the crystal accurately, base B is tilted to the left or right, as required, and guide support 12 and hence holder 11 as well as crystal 30 is swiveled laterally to the left or right, as required, until a plurality of characteristic small luminous spots 135 appear on fluorescent screen 130. Whether the electrical axis of the crystal has been brought to a position substantially perpendicular to the reference line or part of base A can be observed by the size and position of the luminous spots on the fluorescent screen. When a plurality of larger characteristic luminous spots 136 are made to appear on and disappear from the fluorescent screen, as indicated in Fig. 3, the adjustment is about completed. In other words, when base B is tilted to the left or right, as required, on pivot posts 32 and 33, a point is reached where, if the holder as a unit is moved slightly to the left or right by turning guide support 12 with a suitable turning of knob 123, as required, larger spots 136 may be brought in and out of sight. This is an indication that base B has been suitably adjusted. Nuts 46 and 47 are then tightened to fix base B in its adjusted position. If this has been done properly, the particular electrical axis of the crystal is brought into predetermined and fixed relationship with the reference line or part of the holder. Since the relative fixed position of the optical axis with respect to the reference line or part of the holder is not disturbed, the net result of the operation is to leave both the particular electrical axis and the optical axis in fixed predetermined relationship with the reference line or part of the holder.

It will be clear that the reference line or part may be varied. For example, the various elements going into the apparatus may be so constructed that an edge or a face of guide channel 31, etc.; or an edge or a face of adjustable guide support 12, etc., may be employed. The important thing is to select a suitable reference line or part and then to operate the apparatus with respect to that reference line or part in order to obtain the advantages of the invention.

The holder with the crystal mounted thereon may then be removed from guide support 12. With bases B, C, and D fixed in their adjusted positions, the entire holder assembly may be employed to cut the crystal at any predetermined angle of cut. This may be done, for example, as more fully described in my copending application Serial No. 511,204, filed November 20, 1943, now Patent No. 2,413,795.

I claim:
1. In apparatus for manufacturing quartz oscillator plates, in which an electrical axis of the crystal is located by passing X-rays to and deflecting them from the crystal, the improvement comprising an X-ray machine, means associated with the X-ray machine for emitting X-rays in a predetermined direction, a guide support, a removable holder adapted to engage the guide support in a predetermined position, the guide support and the holder being provided with parts adapted to engage one another so that the base of the holder may always be placed in the same position with respect to the guide support and to X-rays passed into the crystal, means associated with the holder for supporting a crystal thereon with its optical axis in fixed predetermined relationshop with a given part of the holder, means pivotally mounting said guide support for pivotal adjustment about an axis substantially normal to X-rays from said machine, further means associated with the holder for tilting the crystal about its optical axis while in the path of the X-rays to locate and to place one of its electrical axes in fixed predetermined relationship with said given part of the holder while the optical axis remains in fixed relationship with said given part of the holder, and a fluorescent screen located at a suitable distance from and at a suitable angle to the holder so that X-rays deflected from the crystal supported thereon may impinge on the screen for visual inspection.

2. In apparatus for manufacturing quartz oscillator plates, in which an electrical axis of the crystal is located by passing X-rays onto and deflecting them from the crystal, the improvement comprising an X-ray machine, means associated with the X-ray machine for emitting X-rays in a predetermined direction, a guide support, a removable holder having a reference base adapted to engage the guide support in predetermined relationship with X-rays passed into the crystal, an intermediate support mounted pivotally on the base and tiltable at a predetermined angle to the optical axis, a second intermediate support mounted pivotally on the first intermediate support and tiltable in a predetermined direction to the optical axis, a rotatable base carried by the second intermediate support on which to mount the crystal, said rotatable base and second intermediate support being adjustable with respect to one another and to the first intermediate support to locate the optical axis of the crystal and to fix the optical axis in predetermined relationship with said reference base and to lock the crystal, rotatable base, second intermediate support and first intermediate support as a unit in their adjusted positions, means pivotally mounting said guide support for pivotal adjustment about an axis substantially normal to the X-rays from said machine, said first intermediate support being adjustable with respect to the reference base to fix an electrical axis of the crystal in predetermined relationship with the reference base while the optical axis remains in fixed predetermined relationship with the reference base, and a fluorescent screen located at a suitable distance from and at a suitable angle to the holder so that X-rays deflected from the crystal supported thereon may impinge on the screen for visual inspection.

3. In apparatus for manufacturing quartz oscillator plates, in which an electrical axis of the crystal is located by passing X-rays onto and deflecting them from the crystal, the improvement comprising an X-ray machine, means associated with the X-ray machine for emitting X-rays in a predetermined direction, a guide support, a holder provided with a reference base having a part adapted to engage the guide support in parallel alignment with X-rays passed into the crystal, an intermediate support mounted pivotally on the base and tiltable at right angles to the optical axis, a second intermediate support mounted pivotally on the first intermediate support and tiltable in parallel alignment with the optical axis, a rotatable base carried by the second intermediate support on which to mount the crystal, said rotatable base and second intermediate support being independently adjustable on axes substantially at right angles with respect to one another and to the first intermediate support to locate the optical axis of the crystal and to fix the optical axis in parallel alignment with said reference base part and to lock the crystal, rotatable base, second intermediate support and first intermediate support as a unit in their adjusted positions, means pivotally mounting said guide support for pivotal adjustment about an axis substantially normal to the X-rays from said machine, said first intermediate support being adjustable with respect to the reference base part to fix an electrical axis of the crystal at right angles to the reference base part while the optical axis remains in fixed parallel alignment with the reference base part, and a fluorescent screen located at a suitable distance from and at a suitable angle to the holder so that X-rays deflected from the crystal supported thereon may impinge on the screen for visual ispection.

4. In apparatus for manufacturing quartz oscillator plates, in which an electrical axis of the crystal is located by passing X-rays onto and deflecting them from the crystal, the improvement comprising an X-ray machine, means associated with the X-ray machine for emitting X-rays in a predetermined direction, a guide support, the guide support being pivotally supported and provided with adjustable means to swivel it laterally about its pivot support, a removable holder having a reference base adapted to engage the guide support in predetermined relationship with X-rays passed into the crystal, an intermediate support mounted pivotally on the base and tiltable at a predetermined angle to the optical axis, a second intermediate support mounted pivotally on the first intermediate support and tiltable in a predetermined direction to the optical axis, a rotatable base carried by the second intermediate support on which to mount the crystal, said rotatable base and second intermediate support being independently adjustable about axes substantially at right angles with respect to one another and to the first intermediate support to locate the optical axis of the crystal and to fix the optical axis in predetermined relationship with said reference base and to lock the crystal, rotatable base, second intermediate support and first intermediate support as a unit in their adjusted positions, means pivotally mounting said guide support for pivotal adjustment about an axis substantially normal to X-rays from said machine, said first intermediate support being adjustable with respect to the reference base to fix an electrical axis of the crystal in predetermined relationship with the reference base while the optical axis remains in fixed predetermined relationship with the reference base, and a fluorescent screen located at a suitable distance from and at a suitable angle to the holder so that X-rays deflected from the crystal supported thereon may impinge on the screen for visual inspection.

5. In apparatus for manufacturing quartz oscillator plates, in which an electrical axis of the crystal is located by passing X-rays into and deflecting them from the crystal, the improvement comprising an X-ray machine, means associated with the X-ray machine for emitting X-rays in a predetermined direction, a guide support, a removable holder adapted to engage the guide support in a predetermined position, means associated with the holder for supporting a crystal thereon with its optical axis in fixed predetermined relationship with a given part of the holder, further means associated with the holder for tilting the crystal about its optical axis while in the path of the X-rays to locate and to place one of its electrical axes in fixed predetermined relationship with said given part of the holder while the optical axis remains in fixed relationship with said given part of the holder, and adjustable means mounting said guide support for lateral movement about an axis substantially normal to X-rays emitted from said machine.

6. In apparatus for manufacturing quartz oscillator plates, in which an electrical axis of the crystal is located by passing X-rays into and deflecting them from the crystal, the improvement comprising an X-ray machine, means associated with the X-ray machine for emitting X-rays in a predetermined direction, a guide support, a removable holder adapted to engage the guide support in a predetermined position, means associated with the holder for supporting a crystal thereon with its optical axis in fixed predetermined relationship with a given part of the holder, further means associated with the holder for tilting the crystal about its optical axis while in the path of the X-rays to locate and to place one of its electrical axes in fixed predetermined relationship with said given part of the holder while the optical axis remains in fixed relationship with said given part of the holder, means mounting said guide support for pivotal movement about an axis substantially normal to X-rays emitted from said machine, and means associated with said guide support to adjust it about said axis.

HARRY BERMAN.